(12) United States Patent
Merry et al.

(10) Patent No.: US 11,566,586 B2
(45) Date of Patent: *Jan. 31, 2023

(54) GAS TURBINE ENGINE SHAFT BEARING CONFIGURATION

(71) Applicant: Raytheon Technologies Corporation, Farmington, CT (US)

(72) Inventors: Brian D. Merry, Andover, CT (US); Gabriel L. Suciu, Glastonbury, CT (US); Karl L. Hasel, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/213,725

(22) Filed: Mar. 26, 2021

(65) Prior Publication Data

US 2021/0239074 A1      Aug. 5, 2021

Related U.S. Application Data

(63) Continuation of application No. 16/152,502, filed on Oct. 5, 2018, now Pat. No. 11,149,689, which is a
(Continued)

(51) Int. Cl.
*F02C 7/36* (2006.01)
*F02K 3/00* (2006.01)
(Continued)

(52) U.S. Cl.
CPC .............. *F02K 3/00* (2013.01); *F01D 25/162* (2013.01); *F02C 3/04* (2013.01); *F02C 7/06* (2013.01);
(Continued)

(58) Field of Classification Search
CPC .................................... F02C 7/36; F02C 7/06
See application file for complete search history.

(56) References Cited

U.S. PATENT DOCUMENTS 2,258,792 A    4/1941 New
2,672,726 A    3/1954 Wolf et al.
(Continued)

FOREIGN PATENT DOCUMENTS

EP    0203881    12/1986
EP    0791383    8/1997
(Continued)

OTHER PUBLICATIONS

Bloomer, H.E., Loeffler, I.J., Kreim, W.J., and Coats, J.W. (1981). Comparison of NASA and contractor reslts from aeroacoustic tests of QCSEE OTW engine. NASA Technical Memorandum 81761. Apr. 1, 1981. pp. 1-30.

(Continued)

*Primary Examiner* — Gerald L Sung
(74) *Attorney, Agent, or Firm* — Carlson, Gaskey & Olds, P.C.

(57) ABSTRACT

A gas turbine engine includes a shaft and a hub supported by the shaft. A housing includes an inlet and an intermediate case that respectively provide an inlet and an intermediate case flow path. A rotor is connected to the hub and supports a compressor section arranged axially between the inlet and the intermediate case flow paths. A compressor section inlet has a radially inner boundary that is spaced a second radial distance from the rotational axis different from the first radial distance. First and second bearings support the shaft relative to the intermediate case and the inlet case, respectively. An inner race of the first bearing and an inner race of the second bearing engage and rotate with the hub. A fan shaft is drivingly connected to a fan having fan blades. A (Continued)

gear system is connected to the fan shaft and driven through a flex shaft.

28 Claims, 3 Drawing Sheets

Related U.S. Application Data continuation of application No. 14/821,409, filed on Aug. 7, 2015, now Pat. No. 10,215,094, which is a continuation of application No. 14/219,112, filed on Mar. 19, 2014, now Pat. No. 9,194,329, which is a continuation of application No. 14/012,773, filed on Aug. 28, 2013, now Pat. No. 8,863,491, which is a continuation-in-part of application No. 13/904,416, filed on May 29, 2013, now Pat. No. 11,401,831, which is a continuation of application No. 13/762,970, filed on Feb. 8, 2013, now Pat. No. 8,511,061, which is a continuation of application No. 13/362,170, filed on Jan. 31, 2012, now Pat. No. 8,402,741.

(60) Provisional application No. 61/860,337, filed on Jul. 31, 2013.

(51) Int. Cl.
  *F01D 25/16* (2006.01)
  *F02K 3/04* (2006.01)
  *F02C 7/06* (2006.01)
  *F02C 3/04* (2006.01)

(52) U.S. Cl.
  CPC .................. *F02C 7/36* (2013.01); *F02K 3/04* (2013.01); *Y10T 29/4932* (2015.01)

(56) References Cited

U.S. PATENT DOCUMENTS

| | | | |
|---|---|---|---|
| 2,798,360 | A | 7/1957 | Hazen et al. |
| 2,850,337 | A | 9/1958 | McCallum |
| 2,936,655 | A | 5/1960 | Peterson et al. |
| 3,021,731 | A | 2/1962 | Stoeckicht |
| 3,194,487 | A | 7/1965 | Tyler et al. |
| 3,287,906 | A | 11/1966 | McCormick |
| 3,352,178 | A | 11/1967 | Lindgren et al. |
| 3,412,560 | A | 11/1968 | Gaubatz |
| 3,434,288 | A | 3/1969 | Petrie |
| 3,549,272 | A | 12/1970 | Bouiller et al. |
| 3,638,428 | A | 2/1972 | Shipley et al. |
| 3,664,612 | A | 5/1972 | Skidmore et al. |
| 3,673,802 | A | 7/1972 | Krebs et al. |
| 3,680,309 | A | 8/1972 | Wallace, Jr. |
| 3,727,998 | A | 4/1973 | Haworth et al. |
| 3,729,957 | A | 5/1973 | Petrie et al. |
| 3,737,109 | A | 6/1973 | Johansson |
| 3,738,719 | A | 6/1973 | Langner |
| 3,747,343 | A | 7/1973 | Rosen |
| 3,754,484 | A | 8/1973 | Roberts |
| 3,761,042 | A | 9/1973 | Denning |
| 3,792,586 | A | 2/1974 | Kasmarik et al. |
| 3,820,719 | A | 6/1974 | Clark |
| 3,892,358 | A | 7/1975 | Gisslen |
| 3,896,615 | A | 7/1975 | Slatkin et al. |
| 3,925,979 | A | 12/1975 | Ziegler |
| 3,932,058 | A | 1/1976 | Harner et al. |
| 3,935,558 | A | 1/1976 | Miller et al. |
| 3,971,208 | A | 7/1976 | Schwent |
| 3,988,889 | A | 11/1976 | Chamay et al. |
| 4,003,199 | A | 1/1977 | Bell et al. |
| 4,050,527 | A | 9/1977 | Lebelle |
| 4,055,946 | A | 11/1977 | Sens |
| 4,084,861 | A | 4/1978 | Greenberg et al. |
| 4,130,872 | A | 12/1978 | Harloff |
| 4,251,987 | A | 2/1981 | Adamson |
| 4,284,174 | A | 8/1981 | Salvana et al. |
| 4,289,360 | A | 9/1981 | Zirin |
| 4,452,037 | A | 6/1984 | Waddington et al. |
| 4,478,551 | A | 10/1984 | Honeycutt, Jr. et al. |
| 4,500,143 | A | 2/1985 | Kervistin et al. |
| 4,523,864 | A | 6/1985 | Walter et al. |
| 4,649,114 | A | 3/1987 | Miltenburger et al. |
| 4,687,346 | A | 8/1987 | Suciu |
| 4,696,156 | A | 9/1987 | Burr et al. |
| 4,704,862 | A | 11/1987 | Dennison et al. |
| 4,727,762 | A | 3/1988 | Hayashi |
| 4,782,658 | A | 11/1988 | Perry |
| 4,827,712 | A | 5/1989 | Coplin |
| 4,867,655 | A | 9/1989 | Barbie et al. |
| 4,911,610 | A | 3/1990 | Olschewski et al. |
| 4,916,894 | A | 4/1990 | Adamson et al. |
| 4,951,461 | A | 8/1990 | Butler |
| 4,952,076 | A | 8/1990 | Wiley, III et al. |
| 4,979,362 | A | 12/1990 | Vershure, Jr. |
| 4,981,415 | A | 1/1991 | Marmol et al. |
| 5,051,005 | A | 9/1991 | Duncan |
| 5,102,379 | A | 4/1992 | Pagluica et al. |
| 5,127,794 | A | 7/1992 | Burge et al. |
| 5,141,400 | A | 8/1992 | Murphy et al. |
| 5,155,993 | A | 10/1992 | Baughman et al. |
| 5,174,525 | A | 12/1992 | Schilling |
| 5,317,877 | A | 6/1994 | Stuart |
| 5,343,696 | A | 9/1994 | Rohra et al. |
| 5,361,580 | A | 11/1994 | Ciokajlo et al. |
| 5,380,155 | A | 1/1995 | Varsik et al. |
| 5,410,870 | A | 5/1995 | Brauit et al. |
| 5,433,674 | A | 7/1995 | Sheridan et al. |
| 5,447,411 | A | 9/1995 | Curley et al. |
| 5,466,198 | A | 11/1995 | McKibbin et al. |
| 5,524,847 | A | 6/1996 | Brodell et al. |
| 5,553,449 | A | 9/1996 | Rodgers et al. |
| 5,622,438 | A | 4/1997 | Walsh et al. |
| 5,634,767 | A | 6/1997 | Dawson |
| 5,677,060 | A | 10/1997 | Terentieva et al. |
| 5,687,561 | A | 11/1997 | Newton |
| 5,778,659 | A | 7/1998 | Duesler et al. |
| 5,791,789 | A | 8/1998 | Van Duyn et al. |
| 5,806,303 | A | 9/1998 | Johnson |
| 5,809,772 | A | 9/1998 | Giffin, III et al. |
| 5,857,836 | A | 1/1999 | Stickler et al. |
| 5,860,275 | A | 1/1999 | Newton et al. |
| 5,867,980 | A | 2/1999 | Bartos |
| 5,915,917 | A | 6/1999 | Eveker et al. |
| 5,975,841 | A | 11/1999 | Lindemuth et al. |
| 5,985,470 | A | 11/1999 | Spitsberg et al. |
| 6,082,959 | A | 7/2000 | Van Duyn |
| 6,148,518 | A | 11/2000 | Weiner et al. |
| 6,158,210 | A | 12/2000 | Orlando |
| 6,203,273 | B1 | 3/2001 | Weiner et al. |
| 6,223,616 | B1 | 5/2001 | Sheridan |
| 6,315,815 | B1 | 11/2001 | Spadaccini et al. |
| 6,318,070 | B1 | 11/2001 | Rey et al. |
| 6,338,609 | B1 | 1/2002 | Decker et al. |
| 6,387,456 | B1 | 5/2002 | Eaton, Jr. et al. |
| 6,439,772 | B1 | 8/2002 | Ommundson et al. |
| 6,464,401 | B1 | 10/2002 | Allard |
| 6,517,341 | B1 | 2/2003 | Brun et al. |
| 6,607,165 | B1 | 8/2003 | Manteiga et al. |
| 6,619,030 | B1 | 9/2003 | Seda et al. |
| 6,623,166 | B2 | 9/2003 | Andren et al. |
| 6,709,492 | B1 | 3/2004 | Spadaccini et al. |
| 6,732,502 | B2 | 5/2004 | Seda et al. |
| 6,814,541 | B2 | 11/2004 | Evans et al. |
| 6,883,303 | B1 | 4/2005 | Seda |
| 6,942,451 | B1 | 9/2005 | Alexander et al. |
| 7,004,722 | B2 | 2/2006 | Teramura et al. |
| 7,021,042 | B2 | 4/2006 | Law |
| 7,219,490 | B2 | 1/2007 | Dev |
| 7,328,580 | B2 | 2/2008 | Lee et al. |
| 7,374,403 | B2 | 5/2008 | Decker et al. |
| 7,412,819 | B2 | 8/2008 | Bart et al. |
| 7,487,630 | B2 | 2/2009 | Weiler |
| 7,490,460 | B2 | 2/2009 | Moniz et al. |

(56) References Cited

U.S. PATENT DOCUMENTS

| | | | |
|---|---|---|---|
| 7,493,753 B2 | 2/2009 | Moniz et al. | |
| 7,500,365 B2 | 3/2009 | Suciu et al. | |
| 7,591,594 B2 | 9/2009 | Charier et al. | |
| 7,591,754 B2 | 9/2009 | Duong et al. | |
| 7,632,064 B2 | 12/2009 | Somanath | |
| 7,634,916 B2 | 12/2009 | Mace et al. | |
| 7,662,059 B2 | 2/2010 | McCune | |
| 7,694,505 B2 | 4/2010 | Schilling | |
| 7,704,178 B2 | 4/2010 | Sheridan et al. | |
| 7,721,549 B2 | 5/2010 | Baran | |
| 7,730,715 B2 | 6/2010 | Grudnoski et al. | |
| 7,806,651 B2 | 10/2010 | Kennepohl et al. | |
| 7,824,305 B2 | 11/2010 | Duong et al. | |
| 7,828,682 B2 | 11/2010 | Smook | |
| 7,832,193 B2 | 11/2010 | Orlando et al. | |
| 7,882,693 B2 | 2/2011 | Schilling | |
| 7,883,315 B2 | 2/2011 | Suciu et al. | |
| 7,905,083 B2 | 3/2011 | Orlando et al. | |
| 7,926,260 B2 | 4/2011 | Sheridan et al. | |
| 7,997,868 B1 | 8/2011 | Liang et al. | |
| 8,075,261 B2 | 12/2011 | Merry et al. | |
| 8,104,262 B2 | 1/2012 | Marshall | |
| 8,205,432 B2 | 6/2012 | Sheridan | |
| 8,225,593 B2 | 7/2012 | Le Hong et al. | |
| 8,337,149 B1 | 12/2012 | Hasel et al. | |
| 8,402,741 B1 | 3/2013 | Merry et al. | |
| 8,511,061 B1 | 8/2013 | Merry et al. | |
| 8,672,801 B2 | 3/2014 | McCune et al. | |
| 9,194,329 B2 * | 11/2015 | Merry | F02K 3/04 |
| 9,957,918 B2 | 5/2018 | Suciu et al. | |
| 10,215,094 B2 * | 2/2019 | Merry | F02C 7/36 |
| 11,149,689 B2 * | 10/2021 | Merry | F01D 25/162 |
| 2001/0047651 A1 | 12/2001 | Fukutani | |
| 2005/0026745 A1 | 2/2005 | Mitrovic | |
| 2005/0150204 A1 | 7/2005 | Stretton et al. | |
| 2005/0265825 A1 | 12/2005 | Lewis | |
| 2006/0090451 A1 | 5/2006 | Moniz et al. | |
| 2006/0130456 A1 | 6/2006 | Suciu et al. | |
| 2006/0196164 A1 | 9/2006 | Donohue | |
| 2006/0228206 A1 | 10/2006 | Decker et al. | |
| 2006/0239845 A1 | 10/2006 | Yamamoto et al. | |
| 2007/0084183 A1 | 4/2007 | Moniz et al. | |
| 2007/0084190 A1 | 4/2007 | Moniz et al. | |
| 2007/0087892 A1 | 4/2007 | Orlando et al. | |
| 2007/0251210 A1 | 11/2007 | Ceric et al. | |
| 2008/0003096 A1 | 1/2008 | Kohli et al. | |
| 2008/0022653 A1 | 1/2008 | Schilling | |
| 2008/0053062 A1 | 3/2008 | Tuttle | |
| 2008/0098715 A1 * | 5/2008 | Orlando | F02K 3/072 60/268 |
| 2008/0098717 A1 | 5/2008 | Orlando et al. | |
| 2008/0116009 A1 | 5/2008 | Sheridan et al. | |
| 2008/0148707 A1 | 6/2008 | Schilling | |
| 2008/0152477 A1 | 6/2008 | Moniz et al. | |
| 2008/0155961 A1 | 7/2008 | Johnson | |
| 2008/0317588 A1 | 12/2008 | Grabowski et al. | |
| 2009/0056306 A1 * | 3/2009 | Suciu | F02C 7/36 60/226.1 |
| 2009/0056343 A1 | 3/2009 | Suciu et al. | |
| 2009/0074565 A1 | 3/2009 | Suciu et al. | |
| 2009/0081035 A1 | 3/2009 | Merry et al. | |
| 2009/0081039 A1 * | 3/2009 | McCune | F02C 7/36 415/214.1 |
| 2009/0090096 A1 | 4/2009 | Sheridan | |
| 2009/0092487 A1 | 4/2009 | McCune et al. | |
| 2009/0123271 A1 | 5/2009 | Coffin et al. | |
| 2009/0180864 A1 | 7/2009 | Alvanos et al. | |
| 2009/0314881 A1 | 12/2009 | Suciu et al. | |
| 2010/0058735 A1 | 3/2010 | Hurwitz et al. | |
| 2010/0105516 A1 | 4/2010 | Sheridan et al. | |
| 2010/0148396 A1 | 6/2010 | Xie et al. | |
| 2010/0150702 A1 | 6/2010 | Sheridan et al. | |
| 2010/0170224 A1 | 7/2010 | Clark et al. | |
| 2010/0212281 A1 | 8/2010 | Sheridan | |
| 2010/0218478 A1 | 9/2010 | Merry et al. | |
| 2010/0218483 A1 | 9/2010 | Smith | |
| 2010/0223903 A1 | 9/2010 | Starr | |
| 2010/0294371 A1 | 11/2010 | Parnin et al. | |
| 2010/0296947 A1 | 11/2010 | DiBenedetto et al. | |
| 2010/0331139 A1 | 12/2010 | McCune | |
| 2011/0047959 A1 | 3/2011 | DiBenedetto | |
| 2011/0123326 A1 | 5/2011 | DiBenedetto et al. | |
| 2011/0130246 A1 * | 6/2011 | McCune | F01D 25/164 29/700 |
| 2011/0159797 A1 | 6/2011 | Beltman et al. | |
| 2011/0219781 A1 | 9/2011 | Benjamin et al. | |
| 2011/0289900 A1 | 12/2011 | Stern | |
| 2011/0293423 A1 | 12/2011 | Bunker et al. | |
| 2012/0124964 A1 | 5/2012 | Hasel et al. | |
| 2012/0192570 A1 | 8/2012 | McCune et al. | |
| 2012/0195753 A1 | 8/2012 | Davis et al. | |
| 2012/0243971 A1 | 9/2012 | McCune et al. | |
| 2012/0257960 A1 | 10/2012 | Reinhardt et al. | |
| 2013/0023378 A1 | 1/2013 | McCune et al. | |
| 2013/0192198 A1 | 8/2013 | Brilliant et al. | |
| 2013/0319006 A1 | 12/2013 | Parnin et al. | |

FOREIGN PATENT DOCUMENTS

| | | |
|---|---|---|
| EP | 1142850 | 10/2001 |
| EP | 1013889 | 8/2005 |
| EP | 1939430 A2 | 7/2008 |
| EP | 2060809 | 2/2011 |
| EP | 2559913 | 2/2013 |
| EP | 2584153 | 4/2013 |
| EP | 2597292 | 5/2013 |
| GB | 1516041 | 6/1978 |
| GB | 2041090 | 9/1980 |
| GB | 2426792 | 12/2006 |
| WO | 2007038674 | 4/2007 |
| WO | 2015047489 A1 | 4/2015 |

OTHER PUBLICATIONS

Bloomer, H.E. and Samanich, N.E. (1982). QCSEE under-the-wing engine acoustic data. NASA-TM-82691. May 1, 1982. pp 1-28.

Bloomer, H.E. and Loeffler, I.J. (1982). QCSEE over-the-wing engine acoustic data. NASA-TM-82708. May 1, 1982. pp. 1-558.

Bloomer, H.E. and Samanich, N.E. (1982). QCSEE under-the-wing enging-wing-flap aerodynamic profile characteristics. NASA-TM-82890. Sep. 1, 1982. pp. 1-48.

Howard, D.F. (1976). QCSEE preliminary under the wing flight propulsion system analysis report. NASA CR-134868. Feb. 1, 1976. pp. 1-260.

Misel, O.W. (1977). QCSEE main reduction gears test program. NASA CR-134669. Mar. 1, 1977. pp. 1-222.

QCSEE Preliminary analyses and design report. vol. 1. (1974). NASA-CR-134838. Oct. 1, 1974. pp. 1-337.

QCSEE preliminary analyses and design report. vol. II. (1974). NASA-CR-134839. Oct. 1, 1974. pp. 340-630.

QCSEE under-the-wing engine composite fan blade design. (1975). NASA-CR-134840. May 1, 1975. pp. 1-51.

QCSEE the aerodynamic and preliminary mechanical design of the QCSEE OTW fan. (1975). NASA-CR-134841. Feb. 1, 1975. pp. 1-74.

QCSEE under-the-wing engine composite fan blade preliminary design test report. (1975). NASA-CR-134846. Sep. 1, 1975. pp. 1-56.

QCSEE over-the-wing final design report. (1977). NASA-CR-134848. Jun. 1, 1977. pp. 1-503.

QCSEE hamilton standard cam/harmonic drive variable pitch fan actuation system derail final design report. (1976). NASA-CR-134852. Mar. 1, 1976. pp. 1-172.

QCSEE main reduction gears bearing development program final report. (1975). NASA-CR-134890. Dec. 1, 1975. pp. 1-41.

QCSEE under-the-wing engine digital control system design report. (1978). NASA-CR-134920. Jan. 1, 1978. pp. 1-309.

QCSEE the aerodynamic and mechanical design of the QCSEE under-the-wing fan. (1977). NASA-CR-135009. Mar. 1, 1977. pp. 1-137.

(56) References Cited

OTHER PUBLICATIONS

OCSEE under-the-wing engine composite fan blade final design test report. (1977). NASA-CR-135046. Feb. 1, 1977. pp. 1-55.
QCSEE over-the-wing propulsion system test report vol. III—mechanical performance. (1978). NASA-CR-135325. Feb. 1, 1978. pp. 1-112.
QCSEE ball spline pitch-change mechanism whirligig test report. (1978). NASA-CR-135354. Sep. 1, 1978. pp. 1-57.
Quiet clean general aviation turbofan (QCGAT) technology study final report vol. I. (1975). NASA-CR-164222. Dec. 1, 1975. pp. 1-186.
Neitzel, R.E., Hirschkron, R. and Johnston, R.P. (1976). Study of unconventional aircraft engines designed for low energy consumption. NASA-CR-135136. Dec. 1, 1976. pp. 1-153.
Neitzel, R., Lee, R., and Chamay, A.J. (1973). Engine and installation preliminary design. Jun. 1, 1973. pp. 1-333.
Parametric study of STOL short-haul transport engine cycles and operational techniques to minimize community noise impact. NASA-CR-114759. Jun. 1, 1974. pp. 1-398.
Sowers, H.D. and Coward, W.E. (1978). QCSEE over-the-wing (OTW) engine acuostic design. NASA-CR-135268. Jun. 1, 1978. pp. 1-52.
Gunston, Bill, "Jane's Aero-Engines," Issue Seven, 2000, pp. 510-512.
Fledderjohn, "The TFE731-5: Evolution of a Decade of Business Jet Service," SAE Technical Paper, Business Aircraft Meeting & Exposition, Apr. 12-15, 1983.
Walsh et al., "Gas Turbine Performance," 1998, 2004, Blackwell Science Ltd., Chapter 5, pp. 159-177.
International Search Report for PCT Application No. PCT/US2013/020462, dated Jul. 30, 2013.
International Preliminary Report on Patentability for PCT Application No. PCT/US2013/020462, dated Aug. 5, 2014.
International Search Report and Written Opinion for PCT Application No. PCT/US2014/043195 dated Feb. 18, 2015.
International Search Report and Written Opinion for PCT/US14/43175 completed on Dec. 17, 2014.
International Search Report and Written Opinion for PCT/US14/43184 completed on Dec. 1, 2014.
Extended European Search Report for European Application No. 14831206.9 dated Mar. 2, 2017.
Extended European Search Report for European Application No. 14849357.0 dated Mar. 22, 2017.
Amato et al, "Planetary Gears" poster, http://www.roymech.co.uk/Useful_Tables/drive/Epi_cyclic-gears.html, downloaded Aug. 6, 2015 1 page.
"Epicylic Gears", http://www.webpages.uidaho.edu/mindworks/Machine_Design/Posters/PDF/Planetary%20Gears%20Poster.pdf, downloaded Aug. 6, 2015, pp. 1-12.
European Search Report for European Patent Application No. 14849357.0 dated Feb. 22, 2017.
European Search Report for European Patent Application No. 14831790.2 dated Mar. 29, 2017.
International Preliminary Report on Patentability for PCT Application No. PCT/US2014/043195, dated Feb. 11, 2016.
International Preliminary Report on Patentability for PCT Application No. PCT/US2014/043184, dated Feb. 11, 2016.
International Preliminary Report on Patentability for PCT Application No. PCT/US2014/043175, dated Feb. 11, 2016.
Extended European Search Report for European Application No. 15199861.4 dated Sep. 16, 2016.
"Fan engineering, Information and recommendations for the engineer," Twin City Fan Companies, LTD, 2000.
Supplementary European Search Report for European Patent Application No. 13770230.4, dated Aug. 6, 2015.
European Search Report for European Application No. 18208937.5 dated Mar. 8, 2019.

Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.
Johnston, R.P. and Hemsworth, M.C. (1978). Energy efficient engine preliminary design and integration studies. Jun. 1, 1978. pp. 1-28.
Awker, R.W. (1986). Evaluation of propfan propulsion applied to general aviation. NASA CR-175020. Mar. 1, 1986. pp. 1-140.
Howe, D.C. and Wynosky, T.A. (1985). Energy efficient engine program advanced turbofan nacelle definition study. NASA CR-174942. May 1, 1985. pp. 174.
Singh, B. (1986). Small engine component technology (SECT) study. NASA CR-175079. Mar. 1, 1986. pp. 1-102.
Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.
Anderson, R.D. (1985). Advanced Propfan Engine Technology (APET) definition study, single and counter-rotation gearbox/pitch change mechanism design. NASA CR-168115. Jul. 1, 1985. pp. 1-289.
Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.
Gliebe, P.R., Ho, P.Y., and Mani, R. (1995). UHB engine fan and broadband noise reduction study. NASA CR-198357. Jun. 1995. pp. 1-48.
Holcombe, V. (2003). Aero-Propulsion Technology (APT) task V low noise ADP engine definition study. NASA CR-2003-212521. Oct. 1, 2003. pp. 1-73.
Sutliff, D. (2005). Rotating rake turbofan duct mode measurement system. NASA TM-2005-213828. Oct. 1, 2005. pp. 1-34.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
NASA Conference Publication. (1978). CTOL transport technology. NASA-CP-2036-PT-1. Jun. 1, 1978. pp. 1-531.
Gray, D.E. (1978). Energy efficient engine preliminary design and integration studies. NASA-CP-2036-PT-1. Nov. 1978. pp. 89-110.
Kandebo, S.W. (1998). Pratt & Whitney launches geared turbofan engine. Aviation Week & Space Technology, 148 (8). p. 32-4.
Kandebo, S.W. (1998). Geared-Turbofan engine design targets cost, complexity. Aviation Week & Space Technology, 148(8). p. 34-5.
Davis, D.G.M. (1973). Variable-pitch fans: Progress in Britain. Flight International. Apr. 19, 1973. pp. 615-617.
Levintan, R.M. (1975). Q-Fan demonstrator engine. Journal of Aircraft. vol. 12( 8). Aug. 1975. pp. 658-663.
Aerospace Information Report. (2008). Advanced ducted propulsor in-flight thrust determination. SAE International AIR5450. Aug. 2008. p. 1-392.
Technical Report. (1975). Quiet Clean Short-haul Experimental Engine (QCSEE) UTW fan preliminary design. NASA-CR-134842. Feb. 1, 1975. pp. 1-98.
Daggett, D.L., Brown, S.T., and Kawai, R.T. (2003). Ultra-efficient engine diameter study. NASA/CR-2003-212309. May 2003. pp. 1-52.
Technical Report. (1977). Quiet Clean Short-haul Experimental Engine (QCSEE) Under-the-Wing (UTW) final design report. NASA-CR-134847. Jun. 1, 1977. pp. 1-697.
Winn, A. (Ed). (1990). Wide Chord Fan Club. Flight International, 4217(137). May 23-29, 1990. pp. 34-38.
Parker, R.G. and Lin, J. (2001). Modeling, modal properties, and mesh stiffness variation instabilities of planetary gears. Prepared for NASA. NASA/CR-2001-210939. May 2001. pp. 1-111.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Dudley, D.W., Ed. (1954). Handbook of practical gear design. Lancaster, PA: Technomic Publishing Company, Inc. pp. 3.96-102 and 8.12-18.

(56) References Cited

OTHER PUBLICATIONS

Dudley, D.W., Ed. (1962). Gear handbook. New York, NY: McGraw-Hill. pp. 3.14-3.18 and 12.7-12.21.
Dudley, D.W., Ed. (1994). Practical gear design. New York, NY: McGraw-Hill. pp. 119-124.
Product Brochure. Garrett TFE731. Allied Signal. Copyright 1987. pp. 1-24.
Honeywell Learjet 31 and 35/36 TFE731-2 to 2C Engine Upgrade Program. Sep. 2005. pp. 1-4.
Honeywell Sabreliner 65 TFE731-3 to -3D Engine Upgrade Program. Oct. 2005. pp. 1-4.
U.S. Department of Transportation: Federal Aviation Administration Type Certificate Data Sheet No. E6WE. Dated: May 9, 2000. p. 1-9.
Kurzke, J. (2012). GasTurb 12: Design and off-design performance of gas turbines. Retrieved from: https://www.scribd.com/document/153900429/GasTurb-12.
Ahmad, F. and Mizramoghadam, A.V. (1999). Single v. two stage high pressure turbine design of modern aero engines. ASME. Presented at the International Gas Turbine & Aeroengine Congress & Exhibition. Indianapolis, Indiana. Jun. 7-10, 1999. pp. 1-9.
Riegler, C., and Bichlmaier, C. (2007). The geared turbofan technology—Opportunities, challenges and readiness status. Porceedings CEAS. Sep. 10-13, 2007. Berlin, Germany. pp. 1-12.
About GasTurb. Retrieved Jun. 26, 2018 from: http://gasturb.de/about-gasturb.html.
Kurzke, J. (2001). GasTurb 9: A program to calculate design and off-design performance of gas turbines. Retrieved from: https://www.scribd.com/document/92384867/GasTurb9Manual.
Tummers, B. (2006). DataThief III. Retreived from: https://datathief.org/DatathiefManual.pdf pp. 1-52.
Manual. Student's Guide to Learning SolidWorks Software. Dassault Systemes—SolidWorks Corporation. pp. 1-156.
Macisaac, B. and Langston, R. (2011). Gas turbine propulsion systems. Chichester, West Sussex: John Wiley & Sons, Ltd. pp. 260-265.
Datasheet. CFM56-5B For the Airbus A320ceo family and CFM56-7B for the Boeing 737 family. https://www.cfmaeroengines.com/.
Turner, M. G., Norris, A., and Veres, J.P. (2004). High-fidelity three-dimensional simulation of the GE90. NASA/TM-2004-212981. pp. 1-18.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Amezketa, M., Iriarte, X., Ros, J., and Pintor, J. (2009). Dynamic model of a helical gear pair with backlash and angle0varying mesh stiffness. Multibody Dynamics 2009, ECCOMAS Thematic Conference. 2009. pp. 1-36.
Singh, A. (2005). Application of a system level model to study the planetary load sharing behavior. Jounal of Mechanical Design. vol. 127. May 2005. pp. 469-476.
Smith-Boyd, L. and Pike, J. (1986). Expansion of epicyclic gear dynamic analysis program. Prepared for NASA. NASA CR-179563. Aug. 1986. pp. 1-98.
Wikipedia. Torsion spring. Retrieved Jun. 29, 2018 from: https://en.wikipedia.org/wiki/Torsion_spring.
Agma Standard (2006). Design manual for enclosed epicyclic gear drives. Alexandria, VA: American Gear Manufacturers Association. pp. 1-104.
Agma Standard (1997). Design and selection of components for enclosed gear drives. lexandria, VA: American Gear Manufacturers Association. pp. 1-48.
Daly, M. Ed. (2007). Jane's Aero-Engine. Issue Twenty-three. Mar. 2008. p. 707-12.
Agma Standard (1999). Flexible couplings—Mass elastic properties and other characteristics. Alexandria, VA: American Gear Manufacturers Association. pp. 1-46.
Wikipedia. Stiffness. Retrieved Jun. 28, 2018 from: https://en.wikipedia.org/wiki/Stiffness.
Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing Company, Inc. pp. 400-406.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Gray, D.E. and Gardner, W.B. (1983). Energy efficient engine program technology benefit/cost study—vol. 2. NASA CR-174766. Oct. 1983. pp. 1-118.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Howe, D.C., and Wynosky, T.A. (1985). Energy efficient engine program advanced turbofan nacelle definition study. NASA-CR-174942. May 1985. pp. 1-60.
Howe, D.C., and Wynosky, T.A. (1985). Energy efficient engine program advanced turbofan nacelle definition study. NASA-CR-174942. May 1985. University of Washington dated Dec. 13, 1990. pp. 1-14.
Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.
Mattingly, J.D. (1996). Elements of gas turbine propulsion. New York, New York: McGraw-Hill, Inc. pp. 1-18, 60-62, 223-234, 462-479, 517-520, 757-767, and 862-864.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance

(56) References Cited

OTHER PUBLICATIONS and 3D design. Proceedingsof ASME Turbo Expo 2009: Power for Land, Sea and Air. Jun. 8-12, 2009, Orlando, Florida, USA. pp. 1-12.

Han, J., Dutta, S., and Ekkad, S.V. (2000). Gas turbine heat transfer and cooling technology. New York, NY: Taylor & Francis, pp. 1-25, 129-157, and 160-249.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.

Declaration of Reza Abhari, Ph.D. In re U.S. Pat. No. 8,844,265. Executed Jun. 28, 2016. pp. 1-91.

Declaration of John Eaton, Ph.D. In re U.S. Pat. No. 8,869,568. Executed Mar. 28, 2016. pp. 1-87.

Declaration of Reza Abhari. In re U.S. Pat. No. 8,695,920. Executed Nov. 30. pp. 1-67.

Declaration of Reza Abhari. In re U.S. Pat. No. 8,448,895. Executed Nov. 28. pp. 1-81.

Declaration of Reza Abhari. In re U.S. Pat. No. 8,695,920, claims 1-4, 7-14, 17 and 19. Executed Nov. 29. pp. 1-102.

Declaration of Dr. Magdy Attia. In re U.S. Pat. No. 8,313,280. Executed Oct. 21, 2016. pp. 1-88.

Lord, W.K., Macmartin, D.G., and Tillman, T.G. (2000). Flow control opportunities in gas turbine engines. American Institute of Aeronautics and Astronautics. pp. 1-15.

Daly, M. Ed. (2010). Jane's Aero-Engine. Issue Twenty-seven. Mar. 2010. p. 633-636.

Roux, E. (2007). Turbofan and turbojet engines database handbook. Editions Elodie Roux. Blagnac: France. pp. 1-595.

Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.

Declaration of Dr. Magdy Attia. In re U.S. Pat. No. 8,517,668. Executed Dec. 8, 2016. pp. 1-81.

Cramoisi, G. Ed. (2012). Death in the Potomac: The crash of Air Florida Flight 90. Air Crash Investigations. Accident Report NTSB/AAR-82-8. p. 45-47.

Norton, M. and Karczub, D. (2003). Fundamentals of noise and vibration analysis for engineers. Press Syndicate of the University of Cambridge. New York: New York. p. 524.

U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.

U.S. Department of Transportation: Federal Aviation Administration Advisory Circular. Standard operating procedures for flight deck crewmembers. Dated: Feb. 27, 2003. p. 1-6 and Appendices.

Vasudevan, A.K. and Petrovic, J.J. (1992). A comparative overview of molybedenum disilicide composites. Materials Science and Engineering, A155, 1992. pp. 1-17.

Clarke, D.R. and Levi, C.G. (2003). Materials design for the next generation thermal barrier coatings. Annual. Rev. Mater. Res. vol. 33. 2003. pp. 383-417.

Lee, K.N. (2000). Current status of environmental barrier coatings for Si-Based ceramics. Surface and Coatings Technology 133-134, 2000. pp. 1-7.

Bornstein, N. (1993). Oxidation of advanced intermetallic compounds. Journal de Physique IV, 1993, 03 (C9), pp. C9-367-C9-373.

Krenkel, W., Naslain, R., and Schneider, H. Eds. (2001). High temperature ceramic matrix composites pp. 224-229. Weinheim, DE: Wiley-VCH Verlag GmbH.

Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.

Shah, D.M. (1992). MoSi2 and other silicides as high temperature structural materials. Superalloys 1992. The Minerals, Metals, & Materials Society. pp. 409-422.

Zhao, J.C. and Westbrook, J.H. (2003). Ultrahigh-temperature materials for jet engines. MRS Bulletin. vol. 28(9). Sep. 2003. pp. 622-630.

Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.

Jacobson, N.S. (1993). Corrosion of silicon-based ceramics in combustion environments. J. Am. Ceram. Soc. 76(1). pp. 3-28.

Jorgensen, P.J., Wadsworth, M.E., and Cutler, I.B. (1961). Effects of water vapor on oxidation of silicon carbide. J. Am. Ceram. Soc. 44(6). pp. 248-261.

Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.

Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.

Jeng, Y.-L., Lavernia, E.J. (1994). Processing of molybdenum disilicide. J. of Mat. Sci. vol. 29. 1994. pp. 2557-2571.

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.

Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.

Petrovic, J.J., Castro, R.G., Vaidya, R.U., Peters, M.I., Mendoza, D., Hoover, R.C., and Gallegos, D. E. (2001). Molybdenum disilicide materials for glass melting sensor sheaths. Ceramic Engineering and Science Proceedings. vol. 22(3). 2001. pp. 59-64.

Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.

Leckie, F.A. and Dal Bello, D.J. (2009). Strength and stiffness of engineering systems. Mechanical Engineering Series. Springer. pp. 1-3.

El-Sayad, A.F. (2008). Aircraft propulsion and gas turbine engines. Boca Raton, FL: CRC Press, pp. 215-219 and 355-360.

Bunker, R.S. (2005). A review of shaped hole turbine film-cooling technology. Journal of Heat Transfer vol. 127. Apr. 2005. pp. 441-453.

Haldenbrand, R. and Norgren, W.M. (1979). Airesearch QCGAT program [quiet clean general aviation turbofan engines]. NASA-CR-159758. pp. 1-199.

Davies, D. and Miller, D.C. (1971). A variable pitch fan for an ultra quiet demonstrator engine. 1976 Spring Convention: Seeds for Success in Civil Aircraft Design in the Next Two Decades, pp. 1-18.

Middleton, P. (1971). 614: VFW's jet feederliner. Flight International, Nov. 4, 1971. p. 725, 729-732.

Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.

(56) References Cited

OTHER PUBLICATIONS

Baker, R.W. (2000). Membrane technology and applications. New York, NY: McGraw-Hill. pp. 87-153.

Cheryan, M. (1998). Ultrafiltration and microfiltration handbook. Lancaster, PA: Tecnomic Publishing Company, Inc. pp. 171-236.

Seader, J.D. and Henley, E.J. (1998). Separation process principles. New York, NY: John Wiley & Sons, Inc. pp. 722-726 and 764-771.

Spadaccini, L.J., and Huang, H. (2002). On-line fuel deoxygenation for coke suppression. ASME, Jun. 2002. pp. 1-7.

Darrah, S. (1987). Jet fuel deoxygenation. Interim Report for Period Mar. 1987-Jul. 1988. pp. 1-22.

Bucknell, R.L. (1973). Influence of fuels and lubricants on turbine engine design and performance, fuel and lubricant analyses. Final Technical Report, Mar. 1971-Mar. 1973. pp. 1-252.

Hazlett, R.N. (1991). Thermal oxidation stability of aviation turbine fuels. Philadelphia, PA: ASTM. pp. 1-163.

Taylor, W.F. (1974). Deposit formation from deoxygenated hydrocarbons. I. General features. Ind. Eng. Chem., Prod. Res. Develop., vol. 13(2). 1974. pp. 133-138.

Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.

Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.

Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.

Hemighaus, G., Boval, T., Bacha, J., Barnes, F., Franklin, M., Gibbs, L., . . . Morris, J. (2007). Aviation fuels: Technical review. Chevron Products Company. pp. 1-94. Retrieved from: https://www.cgabusinessdesk.com/document/aviation_tech_review.pdf.

Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.

Edwards, T. and Zabarnick, S. (1993). Supercritical fuel deposition mechanisms. Ind. Eng. Chem. Res. vol. 32. 1993. pp. 3117-3122.

Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.

Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.

Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.

Technical Data. Teflon. WS Hampshire Inc. Retrieved from: http://catalog.wshampshire.com/Asset/psg_teflon_ptfe.pdf.

Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.

Edkins, D.P., Hirschkron, R., and Lee, R. (1972). TF34 turbofan quiet engine study. Final Report prepared for NASA. NASA-CR-120914. Jan. 1, 1972. pp. 1-99.

Waters, M.H. and Schairer, E.T. (1977). Analysis of turbofan propulsion system weight and dimensions. NASA Technical Memorandum. Jan. 1977. pp. 1-65.

Meyer, A.G. (1988). Transmission development of TEXTRON Lycoming's geared fan engine. Technical Paper. Oct. 1988. pp. 1-12.

Dudley, D.W., Ed. (1962). Gear handbook. New York, NY: McGraw-Hill. pp. 14-17 (TOC, Preface, and Index).

Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.

Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.

Gates, D. Bombardier flies at higher market. Seattle Times. Jul. 13, 2008. pp. C6.

Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.

Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.

Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.

McCune, M.E. (1993). Initial test results of 40,000 horsepower fan drive gear system for advanced ducted propulsion systems. AIAA 29th Joint Conference and Exhibit. Jun. 28-30, 1993. pp. 1-10.

Wright, G.H. and Russell, J.G. (1990). The M.45SD-02 variable pitch geared fan engine demonstrator test and evaluation experience. Aeronautical Journal., vol. 84(836). Sep. 1980. pp. 268-277.

Drago, R.J. (1974). Heavy-lift helicopter brings up drive ideas. Power Transmission Design. Mar. 1987. pp. 1-15.

Krantz, T.L. (1990). Experimental and analytical evaluation of efficiency of helicopter planetary stage. NASA Technical Paper. Nov. 1990. pp. 1-19.

Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.

Thulin, R.D., Howe, D.C., and Singer, I.D. (1982). Energy efficient engine: High pressure turbine detailed design report. Prepared for NASA. NASA CR-165608. Received Aug. 9, 1984. pp. 1-178.

Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.

Gray, D.E. (1978). Energy efficient engine preliminary design and integration studies. Prepared for NASA. NASA CR-135396. Nov. 1978. pp. 1-366.

Reynolds, C.N. (1985). Advanced prop-fan engine technology (APET) single- and counter-rotation gearbox/pitch change mechanism. Prepared for NASA. NASA CR-168114. (vol. I). Jul. 1985. pp. 1-295.

McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.

Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.

Datasheet. CF6-80C2 high-bypass turbofan engines. Retreived from https://geaviation.com/sites/default/files/datasheet-CF6-80C2.pdf.

Salemme, C.T. and Murphy, G.C. (1979). Metal spar/superhybrid shell composite fan blades. Prepared for NASA. NASA-CR-159594. Aug. 1979. pp. 1-127.

"Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old".

(56) References Cited

OTHER PUBLICATIONS

Datasheet. Genx™ high bypass turbofan engines. Retreived from: https://www.geaviation.com/sites/default/files/datasheet-genx.pdf.
McMillian, A. (2008) Material development for fan blade containment casing. Abstract, p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-153.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers,108(8), 65-67.
Faghri, A. (1995). Heat pipe and science technology. Washington, D.C.: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report. NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, DC.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
2003 NASA seal/secondary air system workshop. (2003). NASA/CP-2004-212963/vol. 1. Sep. 1, 2004. pp. 1-408.
Berton, J.J. and Guynn, M.D. (2012). Multi-objective optimization of a turbofan for an advanced, single-aisle transport. NASA/TM-2012-217428. pp. 1-26.
Chapman, J.W. and Litt, J.S. (2017). Control design for an advanced geared turbofan engine. AIAA Joint Propulsion Conference 2017. Jul. 10, 2017-Jul. 12, 2017. Atlanta, GA. pp. 1-12.
Dalton, III., W.N. (2003). Ultra high bypass ratio low noise engine study. NASA/CR-2003-212523. Nov. 2003. pp. 1-187.

(56) References Cited

OTHER PUBLICATIONS

Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.

Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.

Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.

Guynn, M.D., Berton, J.J., Fisher, K.L., Haller, W.J., Tong, M. T., and Thurman, D.R. (2009). Analysis of turbofan design options for an advanced single-aisle transport aircraft. American Institute of Aeronautics and Astronautics. pp. 1-13.

Mavris, D.N., Schutte, J.S. (2016). Application of deterministic and probabilistic system design methods and enhancements of conceptual design tools for ERA project final report. NASA/CR-2016-219201. May 1, 2016. pp. 1-240.

McCracken, R.C. (1979). Quiet short-haul research aircraft familiarization document. NASA-TM-81149. Nov. 1, 1979. pp. 1-76.

Litt, J.S. (2018). Sixth NASA Glenn Research Center propulsion control and diagnostics (PCD) workshop. NASA/CP-2018-219891. Apr. 1, 2018. pp. 1-403.

Rotordynamic instability problems in high-performance turbomachinery. (1986). NASA conference publication 2443. Jun. 2-4, 1986.

Sargisson, D.F. (1985). Advanced propfan engine technology (APET) and single-rotation gearbox/pitch change mechanism. NASA Contractor Report-168113. R83AEB592. Jun. 1, 1985. pp. 1-476.

Singh, R. and Houser, D.R. (1990). Non-linear dynamic analysis of geared systems. NASA-CR-180495. Feb. 1, 1990. pp. 1-263.

Smith, C.E., Hirschkron, R., and Warren, R.E. (1981). Propulsion system study for small transport aircraft technology (STAT). Final report. NASA-CR-165330. May 1, 1981. pp. 1-216.

Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.

Extended European Search Report for Application No. EP14849357.0, dated Feb. 22, 2017, 7 pages.

Leckie F.A., et al., "Strength and Stiffness of Engineering Systems," Mechanical Engineering Series, Springer, 2009, pp. 1-3.

Meier N. (2005) Civil Turbojet/Turbofan Specifications. Retrieved from http://jet-engine.net/civtfspec.html.

U.S. Appl. No. 13/362,170, filed Jan. 31, 2012, Ted Kim.

U.S. Appl. No. 13/364,798, filed Feb. 2, 2012, Christopher M. Verdier, 19 pages.

U.S. Appl. No. 13/762,970, filed Feb. 8, 2013, Tae Jun Kim, 17 pages.

U.S. Appl. No. 13/904,416, filed May 29, 2013, 16 pages.

\* cited by examiner

GAS TURBINE ENGINE SHAFT BEARING CONFIGURATION

CROSS REFERENCE TO RELATED APPLICATIONS

This application is a continuation of U.S. application Ser. No. 16/152,502, filed on Oct. 5, 2018, which is a continuation of U.S. application Ser. No. 14/821,409, filed on Aug. 7, 2015, now U.S. Pat. No. 10,215,094 issued on Feb. 26, 2019, which is a continuation of U.S. application Ser. No. 14/219,112 filed on Mar. 19, 2014, now U.S. Pat. No. 9,194,329 issued Nov. 24, 2015, which is a continuation of U.S. application Ser. No. 14/012,773, filed on Aug. 28, 2013, now U.S. Pat. No. 8,863,491 issued Oct. 21, 2014, which claims priority to U.S. Provisional Application No. 61/860,337 filed Jul. 31, 2013, and is a continuation-in-part of U.S. application Ser. No. 13/904,416 filed on May 29, 2013, which is a continuation of U.S. application Ser. No. 13/762,970 filed on Feb. 8, 2013, now U.S. Pat. No. 8,511,061 issued Aug. 20, 2013, which is a continuation of U.S. application Ser. No. 13/362,170 filed on Jan. 31, 2012, now U.S. Pat. No. 8,402,741 issued Mar. 26, 2013.

BACKGROUND

Turbomachines, such as gas turbine engines, typically include a fan section, a turbine section, a compressor section, and a combustor section. The fan section drives air along a core flow path into the compressor section. The compressed air is mixed with fuel and combusted in the combustor section. The products of combustion are expanded in the turbine section.

A typical jet engine has two or three spools, or shafts, that transmit torque between the turbine and compressor sections of the engine. Each of these spools is typically supported by two bearings. One bearing, for example, a ball bearing, is arranged at a forward end of the spool and is configured to react to both axial and radial loads. Another bearing, for example, a roller bearing is arranged at the aft end of the spool and is configured to react only to radial loads. This bearing arrangement fully constrains the shaft except for rotation, and axial movement of one free end is permitted to accommodate engine axial growth.

A core inlet typically controls flow of air into the core flow path. The flow of air moves from the core inlet to a compressor section inlet. The relative radial positions of the core inlet and the compressor section inlet may influence flow through the core and a profile of the turbomachine.

SUMMARY

In one exemplary embodiment, a gas turbine engine includes a shaft providing a rotational axis. A hub is operatively supported by the shaft. A housing includes an inlet case and an intermediate case that respectively provide an inlet case flow path and an intermediate case flow path. A rotor is connected to the hub and supports a compressor section. The compressor section is arranged axially between the inlet case flow path and the intermediate case flow path. The rotor is a first stage rotor of a low-pressure compressor. A core inlet has a radially inner boundary that is spaced a first radial distance from the rotational axis. A compressor section inlet has a radially inner boundary that is spaced a second radial distance from the rotational axis. A geared architecture is arranged within the inlet case. The geared architecture includes an epicyclic gear train. The geared architecture includes a torque frame that is secured to the inlet case. The torque frame supports multiple circumferentially arranged star gears intermeshing with a sun gear. The shaft includes a main shaft and a flex shaft. The flex shaft has a first end and a second end. The first end is secured to the main shaft and the sun gear is supported on the second end. A fan is rotationally driven by the geared architecture. First and second bearings support the shaft relative to the intermediate case and the inlet case, respectively. The radially inner boundary of the core inlet is at a location of a core inlet stator and the radially inner boundary of the compressor section inlet is at a location of the first stage low-pressure compressor rotor.

In a further embodiment of the above, an inlet flow of the compressor section is configured to be from about 30 lb/sec/ft$^2$ to about 37 lb/sec/ft$^2$ when the engine is operating at a cruise speed.

In a further embodiment of any of the above, a turbine inlet temperature of a high-pressure turbine within the engine is configured to be from about 2,000° F. to about 2,600° F. when the engine is operating at a cruise speed.

In a further embodiment of any of the above, a tip speed of a blade array in the compressor section during engine operation is configured to be from about 1,050 ft/sec to about 1,350 ft/sec.

In a further embodiment of any of the above, the geared architecture has a gear reduction ratio of greater than about 2.3.

In a further embodiment of any of the above, the geared architecture further includes a ring gear arranged circumferentially about and intermeshing with the star gears. The ring gear drives a fan shaft and the fan shaft rotationally drives the fan.

The present disclosure may include any one or more of the individual features disclosed above and/or below alone or in any combination thereof.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
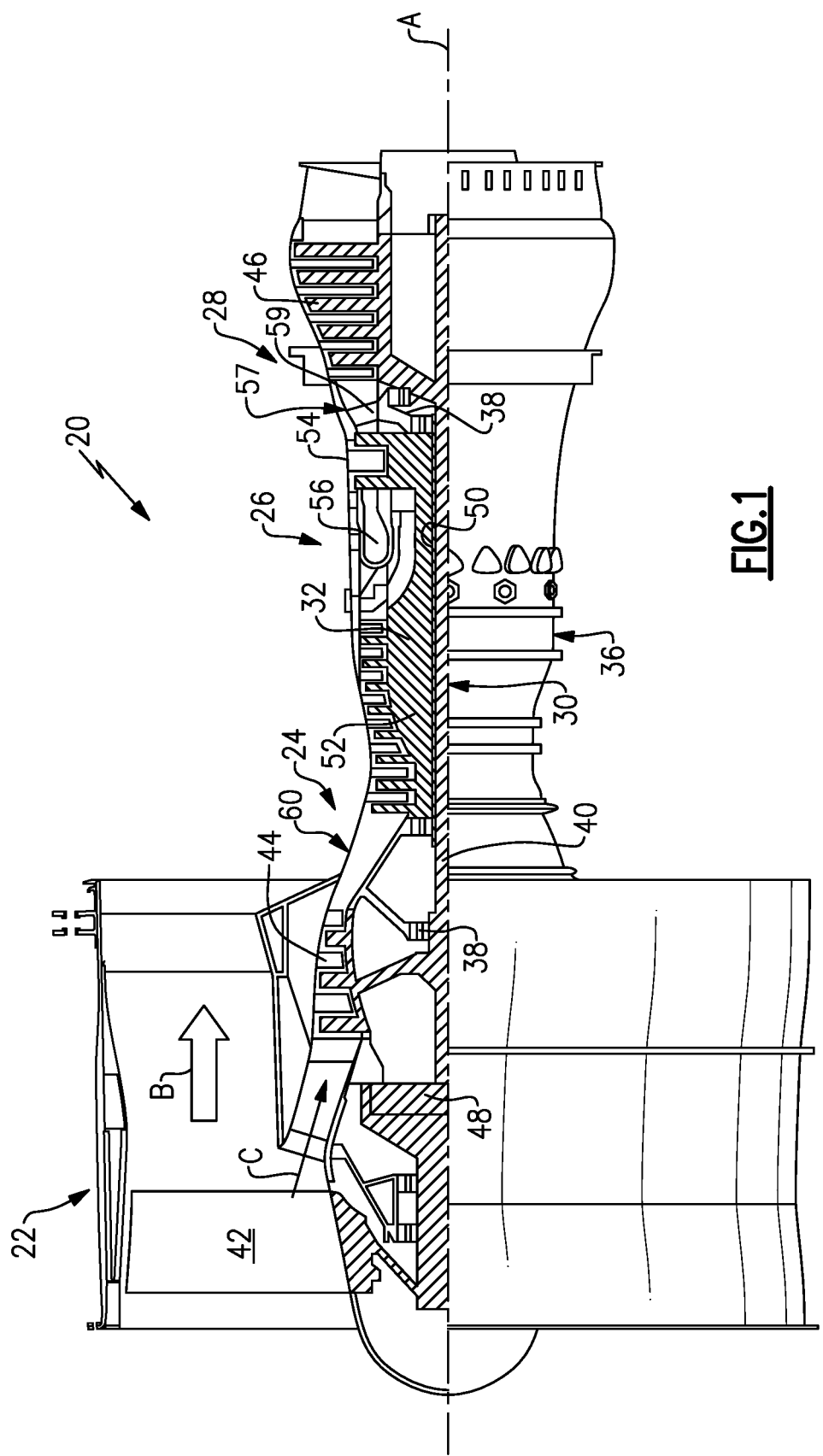
FIG. 1 schematically illustrates an embodiment of a gas turbine engine.
Figure 2:
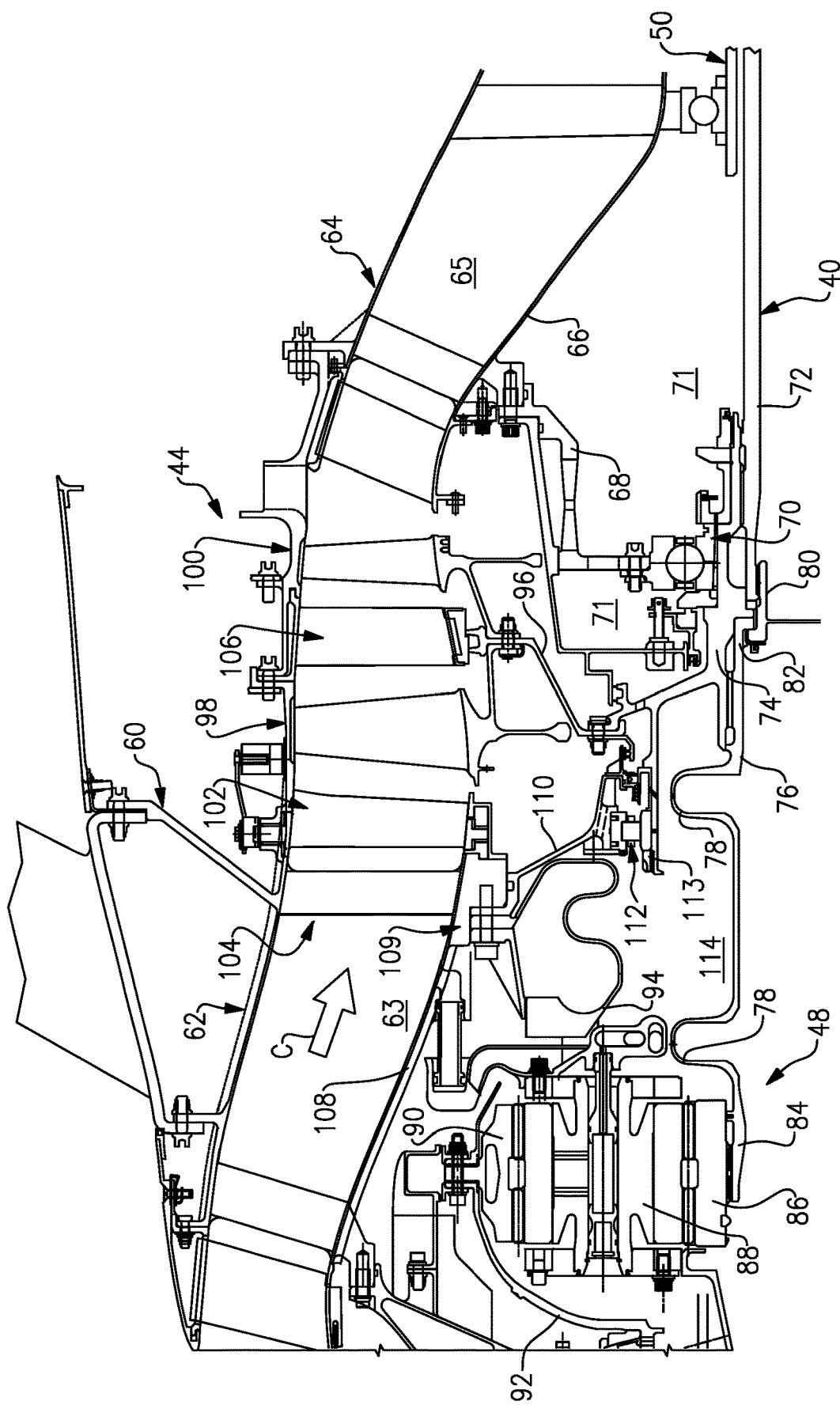
FIG. 2 is a cross-sectional view of a front architecture of the gas turbine engine embodiment shown in FIG. 1.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C (as shown in FIG. 2) for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example a high-bypass geared aircraft engine. In a further example, the engine 20 bypass ratio is greater than about six (6), with an example embodiment being greater than ten (10). The example speed reduction device is a geared architecture 48 however other speed reducing devices such as fluid or electromechanical devices are also within the contemplation of this disclosure. The example geared architecture 48 is an epicyclic gear train, such as a star gear system or other gear system, with a gear reduction ratio of greater than about 2.3, or more specifically, a ratio of from about 2.2 to about 4.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10.67 km). The flight condition of 0.8 Mach and 35,000 ft (10.67 km), with the engine at its best fuel consumption—also known as bucket cruise Thrust Specific Fuel Consumption ("TSFC"). TSFC is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(T_{ambient}°R)/518.7° R)^{0.5}]$. The "Low corrected fan tip speed" as disclosed herein according to one non-limiting embodiment is less than about 1150 ft/second (350 m/second).

Referring to FIG. 2, a core housing 60 includes an inlet case 62 and an intermediate case 64 that respectively provide an inlet case flowpath 63 and a compressor case flowpath 65. In other embodiments, the core housing may include additional cases. Similarly, the compressor section as a whole may include any number of cases. Together, the inlet and compressor case flowpaths 63, 65, in part, define a core flowpath through the engine 20, which directs a core flow C.

The intermediate case 64 includes multiple components, including the intermediate case portion 66, and the bearing support 68 in the example, which are removably secured to one another. The bearing support portion 68 has a first bearing 70 mounted thereto, which supports the inner shaft 40 for rotation relative to the intermediate case 64. In one example, the first bearing 70 is a ball bearing that constrains the inner shaft 40 against axial and radial movement at a forward portion of the inner shaft 40. The first bearing 70 is arranged within a bearing compartment 71.

In the example, the inner shaft 40 is constructed of multiple components that include, for example, a main shaft 72, a hub 74 and a flex shaft 76, which are clamped together by a nut 80 in the example. The first bearing 70 is mounted on the hub 74 (i.e., low pressure compressor hub). The flex shaft 76 includes first and second opposing ends 82, 84. The first end 82 is splined to the hub 74, and the second end 84 is splined to and supports a sun gear 86 of the geared architecture 48. Bellows 78 in the flex shaft 76 accommodate vibration in the geared architecture 48.

The geared architecture 48 includes star gears 88 arranged circumferentially about and intermeshing with the sun gear 86. A ring gear 90 is arranged circumferentially about and intermeshes with the star gears 88. A fan shaft 92 is connected to the ring gear 90 and the fan 42 (FIG. 1). A torque frame 94 supports the star gears 88 and grounds the star gears 88 to the housing 60. In operation, the inner shaft 40 rotationally drives the fan shaft 92 with the rotating ring gear 90 through the grounded star gears 88.

The low pressure compressor 44 includes multiple compressor stages arranged between the inlet and intermediate case flowpaths 63, 65, for example, first and second compressor stages 98, 100, that are secured to the hub 74 by a rotor 96. The first bearing 70 is axially aligned with one of the first and second compressor stages 98, 100. In one example, a variable stator vane array 102 is arranged upstream from the first and second compressor stages 98, 100. Struts 104 are arranged upstream from the variable stator vane array 102. An array of fixed stator vanes 106 may be provided axially between the first and second compressor stages 98, 100. Although a particular configuration of low pressure compressor 44 is illustrated, it should be understood that other configurations may be used and still fall within the scope of this disclosure.

The inlet case 62 includes inlet case portions 108, and bearing support 110, which are removably secured to one another. The bearing support portion 110 and torque frame 94 are secured to the inlet case portion 108 at a joint 109. The bearing support portion 110 supports a second bearing 112, which is a rolling bearing in one example. The second bearing 112 is retained on the hub 74 by a nut 113, for example, and is arranged radially outward from the flex shaft 76 and radially between the torque frame 94 and flex shaft 76. In the example, the second bearing 112 is axially aligned with and radially inward of the variable stator vane array 102. The geared architecture 48 and the second bearing 112 are arranged in a lubrication compartment 114, which is separate from the bearing compartment 71 in the example.

Figure 3:
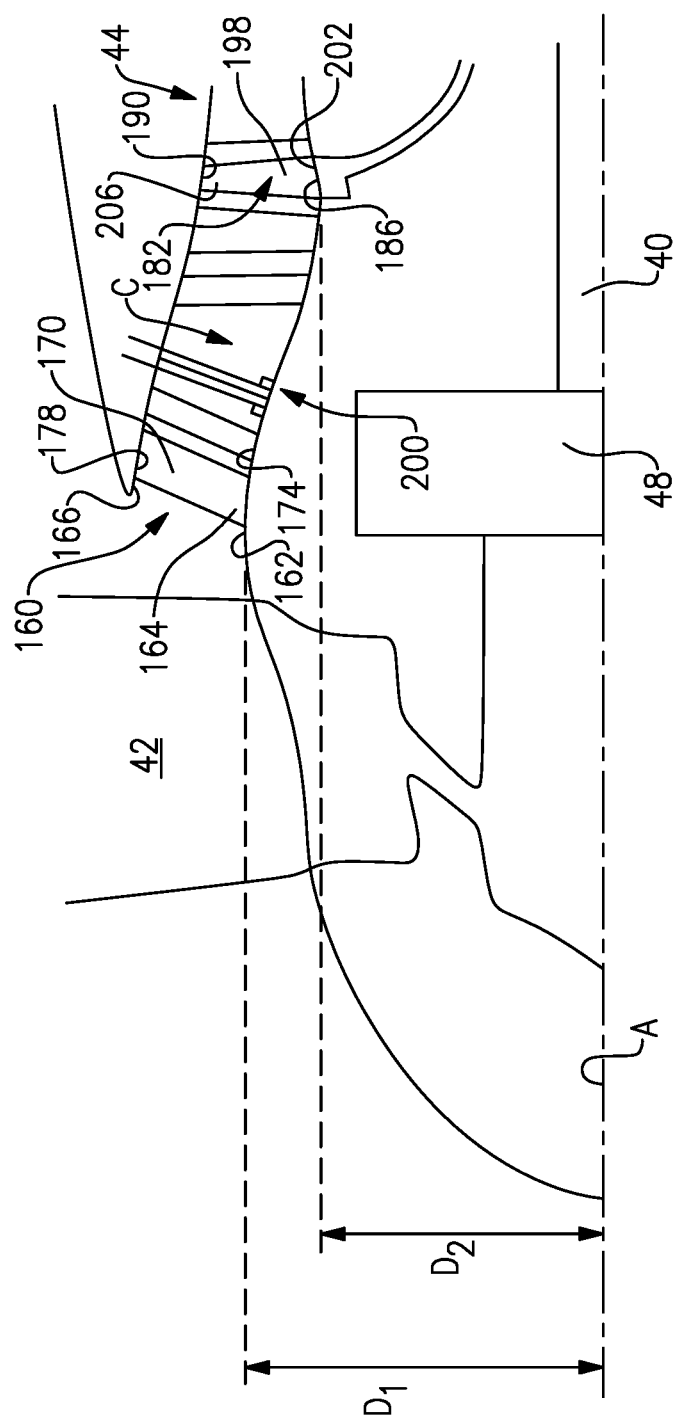
FIG. 3 shows a close-up view of a core inlet portion of the FIG. 1 gas turbine engine embodiment.

Referring now to FIG. 3 with continued reference to FIG. 1, the core flow path of the example engine 20 begins at a core inlet 160 and extends through and past the low-pressure compressor 44. The core inlet 160 has a radially inner boundary 162 and a radially outer boundary 166.

A core inlet stator 170 is located at or near the core inlet 160. The core inlet stator 170 attaches to a core case 174 at the radially inner boundary 162. The core inlet stator 170 attaches to an inlet case 178 at the radially outer boundary 166. The core inlet stator 170 extends radially across the core flow path C.

In this example, the radially inner boundary 162 is positioned a radial distance $D_1$ from the axis A. The distance $D_1$, in this example, also corresponds to the radial distance between a root 164 of the core inlet stator 170 and the axis A. In this example, the root 164 of the core inlet stator 170 is radially aligned with the radially inner boundary 162 of the core flow path C.

After flow moves through the core inlet 160, the flow moves through a compressor inlet 182 into the compressor section 24. In this example, the compressor section inlet 182 is an inlet to the low-pressure compressor 44 of the compressor section 24. The compressor inlet 182 extends from a radially inner boundary 186 to a radially outer boundary 190.

Notably, a blade 198 of a rotor within the low-pressure compressor 44 extends from a root 202 to a tip 206. The blade 198 is located at or near the compressor inlet 182. The blade 198 part of a compressor rotor within a first stage of the compressor section 24. The blade 198 is thus part of a first stage rotor, or a leading blade of the compressor section 24 relative to a direction of flow along the core flow path C.

In some examples, the blade 198 represents the axial position where air enters the compressor section 24 of the core flow path C. The blade 198 extends radially across the core flow path C.

The radially inner boundary 186 is positioned a radial distance $D_2$ from the axis A. The distance $D_2$, in this example, also corresponds to the radial distance between the root 202 of the blade 198 and the axis A. In this example, the root 202 is radially aligned with the radially inner boundary 186 of the core flow path C.

In the example engine 20, a preferred ratio range of the distance $D_2$ to the distance $D_1$ spans from about 0.65 to about 0.9, which provides a relatively low profile core flow path contour. High profile flow path contours have greater differences between $D_2$ and $D_1$, and thus larger "humps" between the core inlet 160 and the compressor inlet 182. High profile flow path contours introduce discontinuities that undesirably disrupt the airflow and undesirably add weight to the engine 20. The ratio range of about 0.65 to about 0.9 is made possible, in part, by the incorporation of the geared architecture 48 into the engine 20. The "hump" in this example is generally area 200. Additionally, since at least one of the first and second bearings 70, 112 are packaged radially inward of the low pressure compressor 44, the distance $D_2$ may be larger as compared to bearing arrangements which have bearings axially offset from the compressor section. Thus, the axially compact low pressure compressor and bearing arrangement also minimizes discontinuities in the flow path contour while reducing the axial length of the engine.

Other characteristics of the engine having this ratio may include the engine 20 having a specific inlet flow of the low pressure compressor at cruising speeds to be between about 30 lb/sec/ft$^2$ and about 37 lb/sec/ft$^2$. The specific inlet flow is the amount of flow moving into the compressor section 24 and specifically, in this example, into a compressor inlet 182 and through the compressor section 24.

Another characteristic of the example engine 20 is that the cruise speeds of the example engine are generally Mach numbers of about 0.7 to about 0.9.

Yet another characteristic of the engine 20 is that a temperature at an inlet to the high-pressure turbine 54 may be from about 2,000° F. (1093.33° C.) to about 2,600° F. (1426.66° C.). Maintaining temperatures within this range balances good fuel consumption, low engine weight, and low engine maintenance costs.

Yet another characteristic of the engine 20 is that a tip speed of blades in a rotor of the low-pressure compressor 44 (a compressor rotor) may be from about 1,050 fps (320 m/s) to about 1,350 fps (411 m/s).

In this example, the geared architecture 48 of the engine 20 may have a gear ratio of greater than about 2.3, or more specifically, a ratio of from about 2.2 to about 4.0.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:
1. A gas turbine engine comprising:
   a core housing providing a core flow path;
   a fan;
   a fan shaft drivingly connected to the fan having fan blades and providing a rotational axis;

a shaft supporting a compressor section arranged within the core flow path, wherein the compressor section is fluidly connected to the fan, the compressor section comprising a first pressure compressor and a second pressure compressor upstream from the first pressure compressor, the second pressure compressor including multiple compressor stages;

a hub operatively supported by the shaft;

a first bearing and a second bearing both supporting the shaft relative to the core housing and the first and second bearings are arranged radially inward of and axially overlapping with at least some of the multiple compressor stages and an inner race of the first bearing and an inner race of the second bearing engage and rotate with the hub, wherein the core housing includes a core inlet with a radially inner boundary that is spaced a first radial distance from the rotational axis, and a compressor section inlet having a radially inner boundary that is spaced a second radial distance from the rotational axis, wherein a ratio of the second radial distance to the first radial distance is about 0.65 to about 0.9;

a geared architecture drivingly connected to the fan shaft, wherein the geared architecture is driven by a low pressure turbine through a flex shaft; and a combustor fluidly connected to the compressor section.

2. The gas turbine engine of claim 1, including a bypass duct at least partially defined by a housing outward of the fan and the fan is located immediately downstream of an inlet to the fan section, and the fan rotates at a rotational speed that is less than a rotational speed of an input to the geared architecture, wherein the geared architecture is positioned intermediate a compressor rotor driven by a low pressure turbine and the fan.

3. The gas turbine engine of claim 1, wherein the hub is positioned intermediate a low pressure turbine and a compressor rotor driven by a low pressure turbine.

4. The gas turbine engine of claim 1, wherein the first bearing is arranged in a first bearing support, the first bearing support removably secured to an intermediate case, and the second bearing is arranged in a second bearing support, the second bearing support removably secured to an inlet case, wherein the second bearing support and the geared architecture are arranged in a lubrication compartment.

5. The gas turbine engine of claim 1, wherein an outer race of the first bearing and an outer race of the second bearing are fixed relative to an engine static structure and the first bearing is arranged within a bearing compartment.

6. The gas turbine engine of claim 5, wherein the geared architecture and the second bearing are arranged in a lubrication compartment separate from the bearing compartment.

7. The gas turbine engine of claim 1, wherein the hub includes a radially inner side and a radially outer side, the first bearing and the second bearing engage the radially outer side and the shaft engages the radially inner side of the hub.

8. A gas turbine engine comprising:
a shaft providing a rotational axis;
a hub operatively supported by the shaft;
a housing including an inlet case and an intermediate case that respectively provide an inlet case flow path and an intermediate case flow path;
a rotor connected to the hub and supporting a compressor section, the compressor section arranged axially between the inlet case flow path and the intermediate case flow path, the rotor is a first stage rotor of a low-pressure compressor;
a core inlet has a radially inner boundary that is spaced a first radial distance from the rotational axis, and a compressor section inlet having a radially inner boundary that is spaced a second radial distance from the rotational axis different from the first radial distance, wherein the radially inner boundary of the core inlet is at a location of a core inlet stator and the radially inner boundary of the compressor section inlet is at a location of the first stage low-pressure compressor rotor, and a ratio of the second radial distance to the first radial distance is about 0.65 to about 0.9;

first and second bearings supporting the shaft relative to the intermediate case and the inlet case, respectively, wherein an inner race of the first bearing and an inner race of the second bearing engage and rotate with the hub;

a fan shaft drivingly connected to a fan having fan blades; and a gear system connected to the fan shaft and driven through a flex shaft.

9. The gas turbine engine of claim 8, wherein an outer race of the first bearing and an outer race of the second bearing are fixed relative to an engine static structure.

10. The gas turbine engine of claim 9, wherein the hub includes a radially inner side and a radially outer side, the first bearing and the second bearing contacts the radially outer side and the shaft contacts the radially inner side of the hub.

11. The gas turbine engine of claim 8, wherein the flex shaft includes a bellows for isolating vibrations from the gear system.

12. The gas turbine engine of claim 8, wherein the first bearing is arranged within a bearing compartment.

13. The gas turbine engine of claim 12, wherein the gear system and the second bearing are arranged in a lubrication compartment separate from the bearing compartment.

14. The gas turbine engine of claim 8, further comprising a variable vane array is arranged upstream from the first stage rotor of the low-pressure compressor, and a low-pressure turbine is supported by the shaft, the low-pressure turbine driving the fan.

15. The gas turbine engine of claim 14, wherein the low-pressure turbine includes a pressure ratio that is greater than five (5).

16. The gas turbine engine of claim 14, wherein the second bearing is axially aligned with the variable vane array.

17. The gas turbine engine of claim 16, wherein the first bearing and the second bearing are arranged radially inward of the low pressure compressor.

18. The gas turbine engine of claim 17, wherein the first bearing is axially aligned with the low pressure compressor.

19. The gas turbine engine of claim 8, wherein a first end of the flex shaft engages the hub and a second end of the flex shaft engages an input to the gear system.

20. The gas turbine engine of claim 8, further comprising an array of fixed stator vanes axially between the first and second stages of the low pressure compressor section.

21. The gas turbine engine of claim 8, wherein the gear system includes an epicyclic gear train, and a low pressure turbine drives the gear system which, in turn, drives the fan.

22. The gas turbine engine of claim 8, including a bypass duct at least partially defined by a housing outward of the fan and the fan is located immediately downstream of an inlet to a fan section, and the fan rotates at a rotational speed that is less than a rotational speed of an input to the gear system.

23. A gas turbine engine comprising:
a shaft providing a rotational axis;
a hub including a radially inner side and a radially outer side and the hub is operatively supported by the shaft and contacts the shaft on the radially inner side of the hub;
a housing including an inlet case and an intermediate case that respectively provide an inlet case flow path and an intermediate case flow path;
a rotor connected to the hub and supporting a compressor section, the compressor section arranged axially between the inlet case flow path and the intermediate case flow path, the rotor is a first stage rotor of a low-pressure compressor;
a core inlet has a radially inner boundary that is spaced a first radial distance from the rotational axis, and a compressor section inlet having a radially inner boundary that is spaced a second radial distance from the rotational axis, wherein a ratio of the second radial distance to the first radial distance is about 0.65 to about 0.9;
a geared architecture arranged within the inlet case, the geared architecture including an epicyclic gear train, the epicyclic gear train grounded to the housing by a torque frame;
a fan drivingly connected to the geared architecture; and
a first bearing and a second bearing both supporting the shaft relative to the intermediate case and the inlet case, respectively, wherein the first bearing and the second bearing engage the radially outer side of the hub.

24. The gas turbine engine according to claim 23, wherein the geared architecture has a gear reduction ratio of greater than about 2.3.

25. The gas turbine engine according to claim 23, wherein the first and second bearings are arranged radially inward of the low pressure compressor.

26. The gas turbine engine according to claim 25, wherein the first bearing is arranged in a first bearing support, the first bearing support removably secured to the intermediate case, and the second bearing is arranged in a second bearing support, the second bearing support removably secured to the inlet case, wherein the second bearing support and the geared architecture are arranged in a lubrication compartment.

27. The gas turbine engine according to claim 25, wherein a flex shaft connects the hub with an input to the geared architecture.

28. The gas turbine engine of claim 23, including a bypass duct at least partially defined by a housing outward of the fan and the fan is located immediately downstream of an inlet to a fan section, and the fan rotates at a rotational speed that is less than a rotational speed of an input to the geared architecture.

* * * * *